E. J. KREIS.
RESILIENT WHEEL.
APPLICATION FILED APR. 12, 1911. RENEWED SEPT. 12, 1912.
1,055,333.
Patented Mar. 11, 1913.
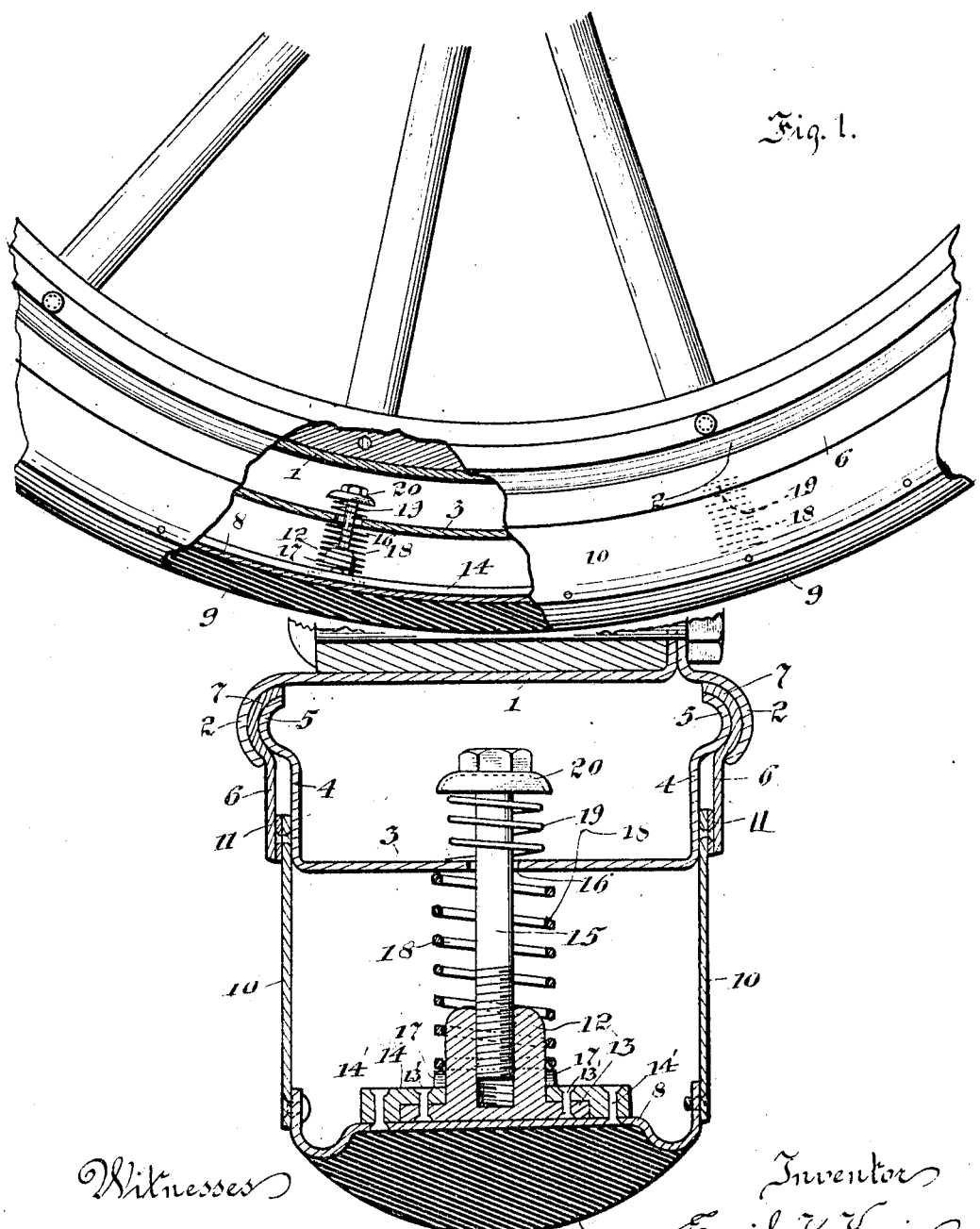

UNITED STATES PATENT OFFICE.

EMIL J. KREIS, OF MENDOTA, ILLINOIS.

RESILIENT WHEEL.

1,055,333. Specification of Letters Patent. Patented Mar. 11, 1913.

Application filed April 12, 1911, Serial No. 620,544. Renewed September 12, 1912. Serial No. 720,089.

*To all whom it may concern:*

Be it known that I, EMIL J. KREIS, a citizen of the United States, and a resident of the city of Mendota, county of Lasalle, and State of Illinois, have invented certain new and useful Improvements in Resilient Wheels, of which the following is a specification.

My invention relates to improvements in resilient wheels and has for its object the provision of a wheel of this character which shall be of simple construction and efficient in operation.

A further and particular object of my invention is to provide a resilient device which may be attached to an ordinary wheel having a clencher rim, in the same manner as a pneumatic tire.

The invention consists in the combinations and arrangements of parts hereinafter described and claimed.

The invention will be best understood by reference to the accompanying drawing forming a part of this specification, and in which, Figure 1 is a partial elevation of the rim of a wheel embodying my invention, a portion of said rim being broken away and shown in section, and Fig. 2 an enlarged section through the rim of the wheel.

The preferred form of construction as illustrated in the drawings comprises an ordinary wheel of any desired construction and provided with an ordinary split rim 1 having the usual securing flanges 2, as shown. A supporting member 3 consisting of an annular channel member having sides 4 is secured in position on rim 1 by means of beads 5 provided at its inner edges and held in position by securing flanges 2, as indicated. Metallic guard rings 6 are placed at either side of supporting member 3 and held in position by means of beads 7 engaging securing flanges 2 as shown.

A tread member 8 is provided with a solid rubber tread 9 and carries inwardly extending leather rings 10 having reinforcing metallic rings 11 secured to their inner edges and fitting loosely between the guard rings 6 and the sides 4 of supporting member 3. By this construction the tread member is formed into an annular channel member radially movable with respect to the supporting member 3.

Threaded studs 12 having circular securing heads 13 are secured at suitable intervals to the inner side of the bottom of tread member 8 by means of a ring 14 which is perforated to permit the passage of studs 12 and is provided with recesses adapted to receive the heads 13. This ring is secured in position by means of rivets 14' and studs 12 are further secured in position by means of rivets 13'' passing through ring 14 and heads 13. Bolts 15 are secured in studs 12 and project inwardly through circumferentially elongated slots 16 in the bottom of supporting member 3 as shown. Rocker supports 17 are provided at each side of studs 12 and support the outer ends of springs 18 on bolts 15 and bearing against the outer side of the bottom of supporting member 3. Springs 19 are interposed between the inner sides of the bottom of supporting member 3 and the heads 20 of bolts 15. By this construction it will be observed that the weight on the axle of the wheel will be resilient supported by the springs 18, in the lower portion of the wheel and by the springs 19 in the upper portion of the wheel. The rocker supports 17 and the circumferential slots 16 permit of the necessary movements of springs 18 and bolts 15 in adjusting themselves to proper positions as the wheel rotates.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. In a device of the class described, a supporting member consisting of an annular channel member provided with beads at its edges adapted to engage the flanges of a clencher rim, there being slots in the bottom of said channel member; a tread member consisting of an annular channel member loosely engaging said supporting member; bolts secured to said tread member and projecting through said slots; springs on said bolts interposed between said tread and outer side of the bottom of said supporting member; and springs on said bolts interposed between the inner side of the bottom of said supporting member and the heads of said bolts, substantially as described.

2. In a device of the class described, a supporting member consisting of an annular channel member provided with beads at its edges adapted to engage the flanges of a clencher rim, there being circumferentially elongated slots in the bottom of said channel member; a tread member consisting of an annular channel member loosely engaging said supporting member; bolts secured to said tread member and projecting through said slots; springs on said bolts interposed between said tread member and the outer side of the bottom of said supporting member; rocker supports carried on said tread member and supporting the outer edges of said springs; and springs on said bolts interposed between the inner side of said supporting member and the heads of said bolts, substantially as described.

3. In a device of the class described, a supporting member consisting of an annular channel member provided with beads at its edges adapted to engage the flanges of a clencher rim, there being circumferentially elongated slots in the bottom of said channel member; a tread member consisting of an annular channel member loosely engaging said supporting member, the sides of said tread member consisting of leather rings reinforced at their inner ends by metal rings; metallic guard rings inclosing the inner edges of said leather rings and provided with beads at their inner edges engaging said securing flanges; bolts secured to said tread member and projecting through said slots; springs on said bolts interposed between said tread and the outer side of the bottom of said supporting member; rocker supports carried by said tread member and supporting the outer ends of said springs; and springs on said flanges interposed between the inner side of the bottom of said supporting member and the heads of said flanges, substantially as described.

4. In a device of the class described, a wheel rim, a supporting member consisting of an annular channel member adapted to be secured to said wheel rim, a tread member, and springs interposed between said supporting and tread members and between said supporting member and said wheel rim.

5. In a device of the class described, a wheel rim, a supporting member consisting of an annular slotted channel member adapted to be secured to said wheel rim, a tread member, bolts secured to said tread member and projecting through the slots in said supporting member, springs on said bolts between said tread and supporting members, and springs on said bolts between the inner side of said supporting member and the bolt heads.

In testimony whereof I have signed my name to this specification in the presence of two subscribing witnesses.

EMIL J. KREIS.

Witnesses:
HELEN F. LILLIS,
JOSHUA R. H. POTTS.